United States Patent
Weber

(10) Patent No.: US 9,387,832 B2
(45) Date of Patent: Jul. 12, 2016

(54) SUPPORTING DEVICE HAVING A MOUNTING UNIT

(71) Applicant: SAF-HOLLAND GmbH, Bessenbach (DE)

(72) Inventor: Elmar Weber, Dülmen (DE)

(73) Assignee: SAF-HOLLAND GmbH, Bessenbach (DE)

( * ) Notice: Subject to any disclaimer, the term of this patent is extended or adjusted under 35 U.S.C. 154(b) by 0 days.

(21) Appl. No.: 14/654,984

(22) PCT Filed: Jan. 24, 2014

(86) PCT No.: PCT/EP2014/051362
§ 371 (c)(1),
(2) Date: Jun. 23, 2015

(87) PCT Pub. No.: WO2014/122030
PCT Pub. Date: Aug. 14, 2014

(65) Prior Publication Data
US 2015/0344003 A1    Dec. 3, 2015

(30) Foreign Application Priority Data
Feb. 8, 2013    (DE) .......................... 10 2013 202 076

(51) Int. Cl.
| | |
|---|---|
| *B60S 9/04* | (2006.01) |
| *B60S 9/08* | (2006.01) |
| *B60S 9/22* | (2006.01) |
| *F16B 2/12* | (2006.01) |
| *F16B 7/04* | (2006.01) |

(52) U.S. Cl.
CPC .... *B60S 9/22* (2013.01); *B60S 9/04* (2013.01); *B60S 9/08* (2013.01); *F16B 2/12* (2013.01); *F16B 7/042* (2013.01)

(58) Field of Classification Search
CPC ............ B60S 9/04; B60S 9/08; Y10S 254/01; B60D 1/66
See application file for complete search history.

(56) References Cited

U.S. PATENT DOCUMENTS

| | | | |
|---|---|---|---|
| 2,650,055 A | 8/1953 | Perkins | |
| 5,980,217 A * | 11/1999 | Swartz ................... | F04B 35/06 280/475 |

(Continued)

FOREIGN PATENT DOCUMENTS

| | | |
|---|---|---|
| DE | 10 2005 034552 A1 | 2/2007 |
| DE | 20 2009 014 883 U1 | 4/2010 |

(Continued)

OTHER PUBLICATIONS

European Patent Office; International Search Report; Mar. 28, 2014.

*Primary Examiner* — Bryan Evans
(74) *Attorney, Agent, or Firm* — Price Heneveld LLP

(57) ABSTRACT

A supporting assembly for semi-trailers includes a mounting unit configured to be arranged on a trailer component and a supporting device having an outer supporting tube and an inner supporting tube and extending in a longitudinal direction, wherein the mounting unit is configured to fix the supporting device transversely to the longitudinal direction by a form fit and a force fit, wherein the mounting unit has an arrangement region comprising an outer contour of the supporting device about the longitudinal axis thereof such that the supporting device can be fixed in a force-fitting and form-fitting manner, and wherein an additional form-fit connection is provided between the supporting device and the mounting unit, which prevents a displacement of the supporting device and the mounting unit relative to each other in the longitudinal direction.

26 Claims, 6 Drawing Sheets

(56) References Cited

U.S. PATENT DOCUMENTS

| | | |
|---|---|---|
| 7,861,982 B1 | 1/2011 | McClure |
| 2004/0159826 A1 | 8/2004 | Peschmann et al. |
| 2009/0057633 A1* | 3/2009 | Beck ........................ B60D 1/66 254/420 |
| 2010/0213427 A1 | 8/2010 | Trowbridge et al. |

FOREIGN PATENT DOCUMENTS

| | | |
|---|---|---|
| EP | 0380941 A2 | 8/1990 |
| EP | 1595761 A1 | 11/2005 |
| FR | 986200 | 3/1951 |

* cited by examiner

SUPPORTING DEVICE HAVING A MOUNTING UNIT

BACKGROUND OF THE INVENTION

The present invention concerns a supporting device for semi-trailers and a mounting unit for supporting devices.

Supporting devices or supporting winches for semi-trailers are known from the prior art. They serve to support or adjust the height of trailers, semi-trailers or vehicles etc. They usually have a telescopic mechanism consisting of an outer supporting tube and an inner supporting tube. The outer and inner supporting tubes engage with each other via a spindle mechanism (nut and threaded spindle). The outer supporting tube has one or more mounting faces for arranging the supporting device on a semi-trailer or similar. These mounting faces are usually welded to or otherwise integrated in the outer supporting tube. However the problem arises that it must be possible to arrange a supporting device on as many different types and sizes of e.g. semi-trailers as possible. Therefore supporting devices with different configurations of mounting faces must be kept available. In Europe, often small mounting faces are used which are positioned either in an upper position or in a lower position relative to the longitudinal direction of the supporting device (or in a double position). In the USA, often a mounting plate in the upper position is used. However the drilling pattern used differs from European versions. This leads to a very great multiplicity of variants of supporting devices.

The object of the present invention is therefore to specify a supporting device for semi-trailers and a mounting unit for supporting devices which reduce the multiplicity of variants and at the same time provide maximum flexibility in the arrangement of the supporting devices on semi-trailers or similar.

SUMMARY OF THE INVENTION

According to the invention, a supporting device is provided, in particular for semi-trailers or trailer units, with a mounting unit, wherein the supporting device extends in a longitudinal direction and wherein the mounting unit is configured to fix the supporting device transversely to the longitudinal direction by form and/or force fit, and to arrange this on a further element, in particular a semi-trailer. The arrangement on the semi-trailer preferably takes place on its chassis or frame in front of and/or behind an axle assembly of the semi-trailer, in order to be able to park the semi-trailer e.g. without the tractor unit, or stabilize it during loading and/or unloading. Evidently, supporting devices of said type can also be used on other vehicles. For the sake of simplicity however, the advantages and features of the invention are indicated only on the example of a semi-trailer, without the restriction of general applicability. Viewed transversely to a longitudinal direction of the semi-trailer, preferably two supporting devices are arranged which are connected together via a connecting shaft. Via the connecting shaft, a simultaneous actuation of the two supporting devices can be achieved. Suitably each supporting device has a straight outer supporting tube and a straight inner supporting tube, wherein the inner supporting tube is arranged telescopically in or on the outer supporting tube, and can be moved relative to the outer supporting tube by means of a spindle mechanism axially fitted in the interior of the supporting device. Advantageously, an adjustment foot or similar is mounted at the end of the inner supporting tube in order to guarantee an optimum "stance" of the supporting device on the ground. To actuate the supporting device, an actuation device is provided which is advantageously configured as a separate assembly and arranged outside the outer supporting tube. The actuation device, which is preferably operated via a hand crank or similar, comprises a gear mechanism which suitably allows height adjustment of the supporting device (via the telescopic mechanism). Advantageously, the above-mentioned connecting shaft is coupled to the actuation device or gear mechanism so that at least two supporting devices can be actuated simultaneously via the hand crank and connecting shaft. Preferably, the outer supporting tube has a rectangular or even largely square cross section, viewed transversely to the longitudinal direction of the supporting device. This cross section must now be fastened to the further element or component to be "supported". Preferably therefore, the outer supporting tube is the region of the supporting device via which the supporting device is arranged on the component to be supported. In particular the arrangement takes place via an outer contour of the outer supporting tube. The force- and/or form-fit connection preferably acts only on the outer contour of the supporting device. This is because an inside of the outer supporting tube must remain as free as possible for displacement of the inner supporting tube. Particularly preferably, the mounting unit is provided for this. Advantageously now there is no need to provide a welded construction or similar in the region of the outer supporting tube for arranging the outer supporting tube on the semi-trailer or on its frame or chassis. Advantageously, the supporting device is fixed in the region of the outer supporting tube by the mounting unit in a form- and/or force-fit connection. Specifically, there is no need for a material-fit connection. The fixing of the supporting device transversely to the longitudinal direction by the form- and/or force-fit connection means in particular that the supporting device is fixed preferably in all directions transversely to the longitudinal direction. The supporting device is arranged indirectly via the mounting unit on the semi-trailer or generally on the element or component to be supported. Since the mounting unit is configured as a separate component, it may be arranged at different positions in the longitudinal direction of the supporting device or at different heights relative to the longitudinal direction of the supporting device. The use of the mounting unit may advantageously reduce the variants or shift them to the end of production. In particular a form- and/or force-fit connection of the mounting unit and supporting device is advantageous here. The arrangement of the mounting unit on the semi-trailer or generally on the component to be supported preferably takes place via at least one suitable fixing region which is described in more detail below. Preferably, the fixing region is a bore or a plurality of bores via which the mounting unit can be attached for example to the semi-trailer by means of bolts.

Advantageously the mounting unit comprises a mounting region and an arrangement region, wherein the mounting region is configured for the arrangement of the supporting device on the further component, and wherein the arrangement region is configured for the fixing of the supporting device. The arrangement region is primarily the region which is provided for the form- and/or force-fit connection of the supporting device, while the mounting region is primarily the region which is provided for the arrangement of the mounting unit on the component to be supported. Here the separation of these tasks or functions need not be strictly observed. Thus the arrangement region may also have one or more fixing regions, or the mounting region may support the form- and/or force-fit connection for fixing the supporting device. It is decisive that the mounting unit is configured to fix the supporting device via the arrangement region by force and/or form fit, and the mounting unit is configured to be arranged on the further element via the mounting region, also preferably by form and/or force fit. Preferably, the arrangement region encloses and/or surrounds the supporting device at least partially in order to create the form- and/or force-fit connection.

Preferably, a displacement and/or twist of the supporting device transversely to or about the longitudinal direction is prevented by the force and/or form fit between the mounting unit and the supporting device. In particular, the displacement and/or twist transversely to the longitudinal direction is prevented by the arrangement region. The supporting device is advantageously fixed or mounted rotationally fixedly by the form- and/or force-fit connection. The mounting unit or arrangement region is here configured such that the supporting device is preferably clamped by it. In other words, the supporting device is preferably connected by form fit to the arrangement region, wherein the force-fit connection is created by cooperation of the arrangement region with the mounting region, for example in that the arrangement region and mounting region are clamped together such that the supporting device is clamped between the arrangement region and the mounting region. The form- and/or force-fit connection fixes the supporting device in all spatial directions. Advantageously, the arrangement region here at least partially surrounds and/or encloses the supporting device.

Advantageously, the mounting region has at least one fixing region for arrangement of the mounting unit on the further element. Advantageously, viewed in the longitudinal direction of the supporting device, two rows of fixing regions are provided in the mounting region which are preferably configured as bores, in particular preferably as round holes or at least also partially as slots, wherein the distance between two successive fixing regions in the longitudinal direction is preferably around 40-70 mm, particularly preferably around 50-60 mm, and quite particularly preferably around 56-58 mm or around 57 mm. Preferably around 6-7 fixing regions are arranged per row, in particular as round holes. The distance between two successive fixing regions in the longitudinal direction of the supporting device, i.e. the hole spacing, relates to the center points of the fixing regions or bores or holes. A row spacing, i.e. the distance between two rows (viewed transversely to the longitudinal direction of the supporting device) preferably lies in the range of around 140-210 mm, particularly preferably in a range from 185-195 mm, quite particularly preferably around 190 mm.

Suitably, the mounting unit is formed from several pieces, in particular two pieces. Preferably, the mounting region is configured as a substantially flat mounting plate, while the arrangement region is preferably configured as a bracket or strap or similar. Preferably, steel is used as a material. The mounting plate is preferably positioned or arranged on the supporting device on the side of the supporting device (or of the outer supporting tube) which faces the component to be supported. The side(s) of the supporting device adjacent to or facing away from this is/are preferably surrounded by the bracket to the same height. The mounting plate and bracket or arrangement region enclose or surround the supporting device preferably at least partially in a plane viewed transversely to the longitudinal direction. The form- and/or force-fit connection between the mounting plate and bracket is created via suitable fixings e.g. bolt connections. Here, advantageously, the mounting unit may be arranged on the component to be supported via the same fixing means. Suitably thus the form- and/or force-fit connection for fixing the supporting device and the arrangement of the mounting unit can be achieved via the same fixing means and fixing regions. Alternatively, preferably, the mounting plate and bracket may also be bolted together separately, whereby the form- and/or force-fit connection is created for fixing the supporting device. By it being surrounded by the bracket, the displacement and/or twist of the supporting device transversely to the longitudinal direction is prevented automatically. Evidently, for this it is not necessary for the mounting unit or bracket to surround the supporting device or its outer supporting tube completely. It is important that there is a sufficient retention for the supporting device in the mounting unit. In configuration or dimensioning it must be taken into account that static test loads of over 70,000 kg (depending on design) must be achieved for supporting devices. Tremendous (supporting) forces therefore occur in the longitudinal direction of the supporting device.

Further preferably, an additional form-fit connection is provided between the supporting device and the mounting unit, which prevents a displacement of the supporting device and mounting unit relative to each other in the longitudinal direction. The additional form-fit is in particular configured to relieve the forces which act on the form- and/or force-fit connection from the element to be supported via the mounting unit in the longitudinal direction. The additional form-fit connection thus allows support of the mounting unit on the supporting device, in particular in its longitudinal direction. The high support forces can advantageously be transmitted to the mounting unit by the additional form-fit connection.

Suitably, the additional form-fit connection is formed by at least one protrusion in the supporting device and/or the mounting unit which engages in a corresponding rebate in the mounting unit or supporting device. Preferably for example the protrusion is arranged on the mounting plate while the corresponding rebate is arranged on the outer supporting tube of the supporting device. Alternatively, preferably, a protrusion may be arranged on the outer supporting tube of the supporting device and engages in a rebate in the mounting plate. Evidently the entire mounting unit, i.e. also the bracket, may be fitted with protrusions and/or rebates. Thus also more than one additional form-fit connection may be provided. Evidently, using the same principle, at least one additional form-fit connection may be provided between the mounting region and the component to be supported, or also between the mounting plate (or mounting region) and the bracket (or arrangement region).

Advantageously, the additional form-fit connection is arranged eccentrically on the mounting region viewed in the longitudinal direction of the supporting device. In other words, the additional form-fit connection is arranged offset by a distance from a center point of the mounting region or mounting plate, i.e. the protrusion and/or rebate is arranged offset by a distance from the center point of the mounting region or mounting plate. Advantageously, in this way, different positions for the fixing regions (in the longitudinal direction of the supporting device) may be achieved, depending on the arrangement of the mounting region on the supporting device. Therefore it need not be defined in advance whether the mounting unit is fixed e.g. in the upper or lower position (cf. prior art) on the supporting device, depending on the height at which the fixing regions should lie, or whether mounting units must be provided for both positions. The upper and lower positions of conventional welded or integrated mounting plates can be covered by "turning" the mounting unit or mounting region, preferably through 180°. Preferably now only a single corresponding protrusion and/or rebate is provided on the corresponding supporting device. The variability with regard to positioning of the fixing regions can be achieved purely via the arrangement of the mounting unit or mounting region on the supporting device. The multiplicity of variants in production of the supporting devices or outer supporting tubes may be reduced. Preferably a ratio of total length of mounting region or mounting plate, viewed in the longitudinal direction of the supporting device, to the distance of the additional form-fit connection from the center point of the mounting region or mounting plate lies in a range of around 3-6, particularly preferably in a range of around 3.5-5.5, quite particularly preferably in a range of around 4.6-4.9. As a result, the additional form-fit connection on the supporting device is arranged preferably around 180-200 mm, quite particularly preferably in a region around 190 mm, below the above-mentioned connecting shaft.

Further preferably, the additional form-fit connection is formed by at least one additional element which is arranged in mutually corresponding openings of the supporting device and the mounting unit. The additional element may for example be a grooved block or a pin which is inserted in the corresponding openings and for example secured via a split pin. For the sake of simplicity of depiction, reference is made here e.g. to crutches which are used to relieve the load on joints and to increase mobility. These are also usually configured telescopically and have a row of corresponding openings, via which different lengths can be set. The supporting device or outer supporting tube of the supporting device is arranged in the mounting unit in the same way as this example.

According to the invention, a mounting unit for supporting devices is provided, wherein the mounting unit is configured to fix a supporting device, in particular for semi-trailers, by form and/or force fit, and wherein the mounting unit can be arranged on a further element, in particular a semi-trailer. The described advantages and features of the supporting device for semi-trailers according to the invention apply in the same way to the mounting unit according to the invention.

Further advantages and features result from the description below of preferred embodiments of the supporting device according to the invention for semi-trailers and the mounting unit for supporting devices according to the invention, with reference to the enclosed figures. Individual features of the individual embodiments may be combined with each other within the context of the invention.

DETAILED DESCRIPTION OF THE PREFERRED EMBODIMENTS

Figure 1:
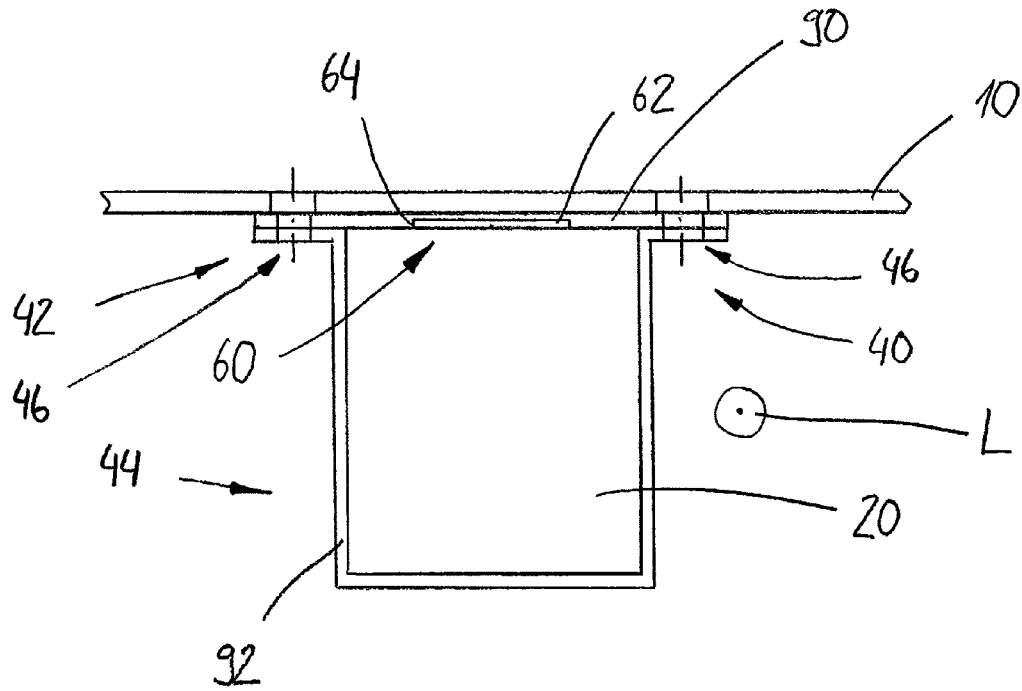
FIG. 1 a cross section of a preferred embodiment of a supporting device for semi-trailers with a mounting unit arranged on a further element.

FIG. 1 shows a cross section of a supporting device 20 for semi-trailers with a mounting unit 40. The mounting unit 40 comprises a mounting region 42 and an arrangement region 44. The supporting device 20 is arranged inside the arrangement region 44. In the preferred embodiment shown, the mounting unit 40 is formed by a mounting plate 90 and a bracket 92 which surround the supporting device 20. In the preferred embodiment shown, the supporting device 20 forms a protrusion 62 which engages in a rebate 64 of the mounting plate 90. In this way an additional form-fit connection 60 is formed. The bracket 92 and mounting plate 90 together form the mounting region 42 which has fixing regions 46, here designed as bores. The bores 46 correspond to suitable holes (no reference numeral) of a further element 10. The further element 10 or the component to be supported may for example be the frame or chassis of a semi-trailer. The section shown is arranged transversely to a longitudinal direction L which extends along the supporting device 20.

Figure 2:
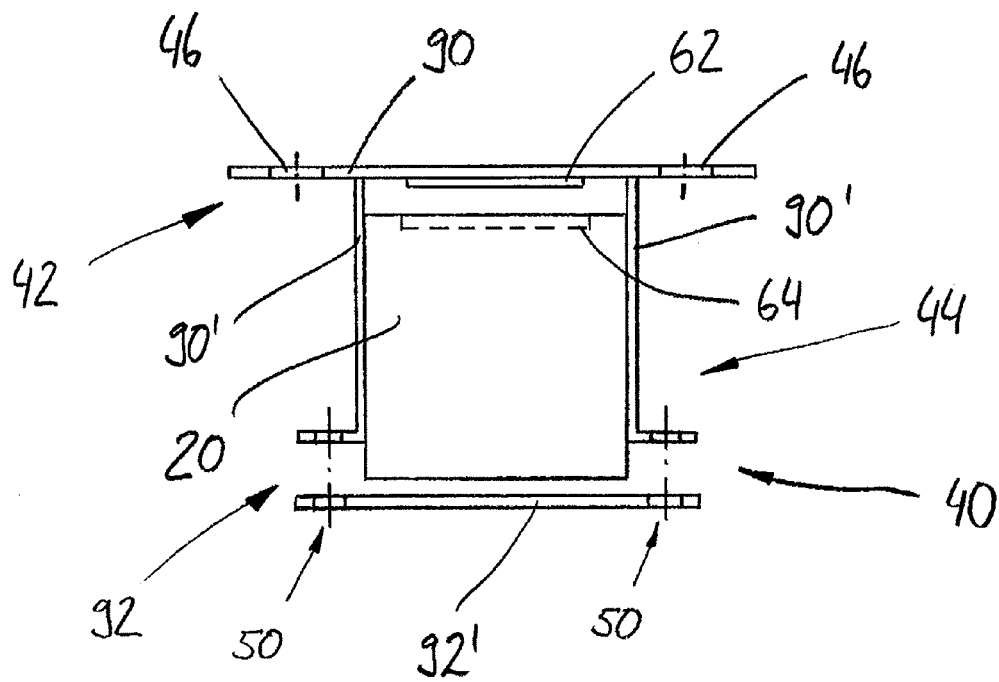
FIG. 2 a cross section of a further preferred embodiment of a supporting device for semi-trailers with a mounting unit.

FIG. 2 shows a cross section of a further preferred embodiment of a supporting device 20 for semi-trailers with a mounting unit 40. A mounting region 42 is formed by a mounting plate 90 which comprises fixing regions 46. Furthermore the mounting plate 90 forms a protrusion 62 which engages in a rebate 64 of the supporting device 20. The mounting plate 90 is provided with two protruding side parts 90' which enclose the supporting device 20 at its sides. In this way an arrangement region 44 is formed which is completed by a cover 92'. The protruding side parts 90' and cover 92' form a bracket 92. The protruding side parts 90' and cover 92' can be connected via bores 50 and suitable fixing means (not shown). In contrast to the embodiment in FIG. 1, in the embodiment in FIG. 2 the fixing regions 46 are provided exclusively for arrangement of the mounting unit 40 on a further element 10 (not shown), and not for creation of the form- and/or force-fit connection for fixing the supporting device 20.

Figure 3A:
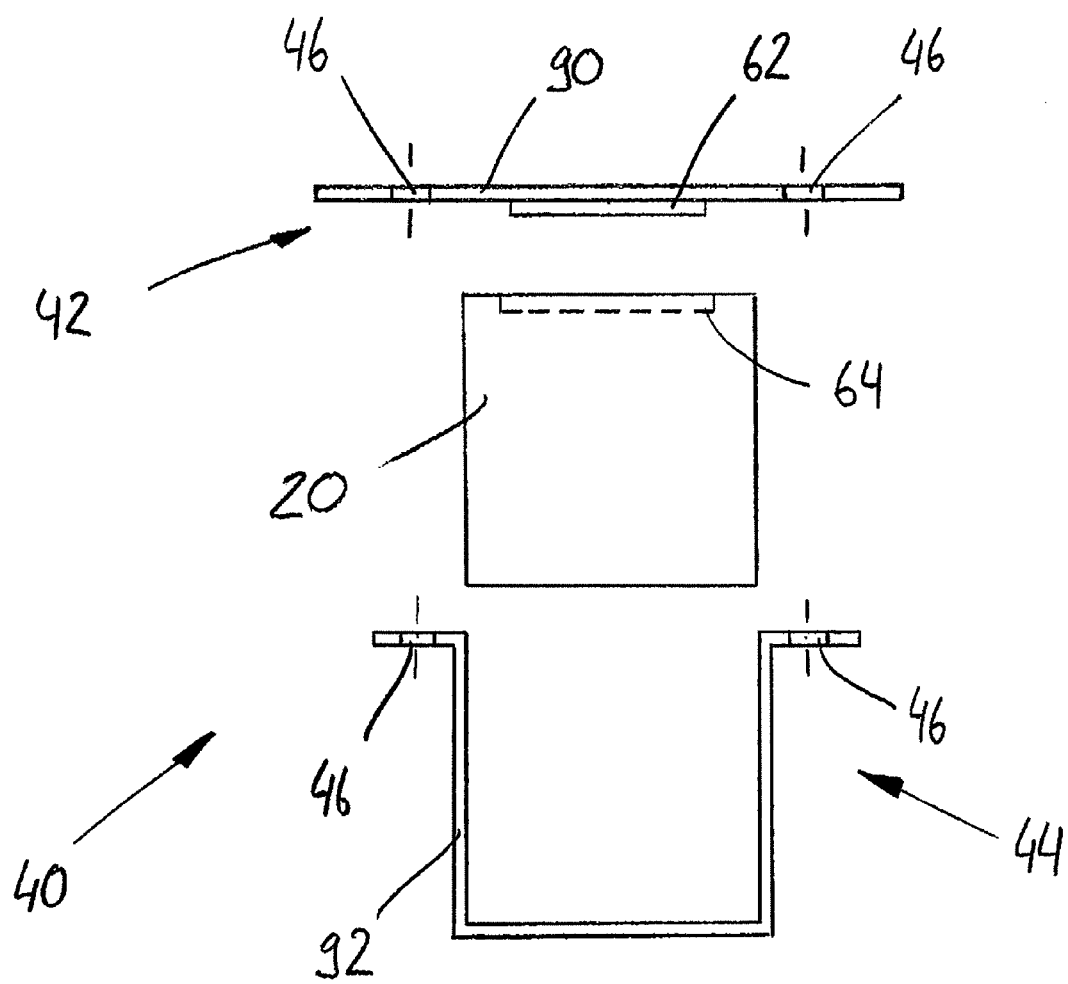
FIG. 3a a cross section of a further preferred embodiment of a supporting device for semi-trailers with a mounting unit.

FIG. 3a shows a further cross section view of a preferred embodiment of a supporting device 20 for semi-trailers with a mounting unit 40. A mounting plate 90 is shown with a protrusion 62 and fixing regions 46. The protrusion 62 of the mounting plate 90 is provided for engagement in a rebate 64 of the supporting device 20. In the preferred embodiment shown, the supporting device 20 is fixed by form fit by means of an arrangement region 44 formed by a bracket 92. The actual force-fit connection takes place via the fixing regions 46 and suitable fixing elements (not shown), e.g. bolts or similar.

Figure 3B:
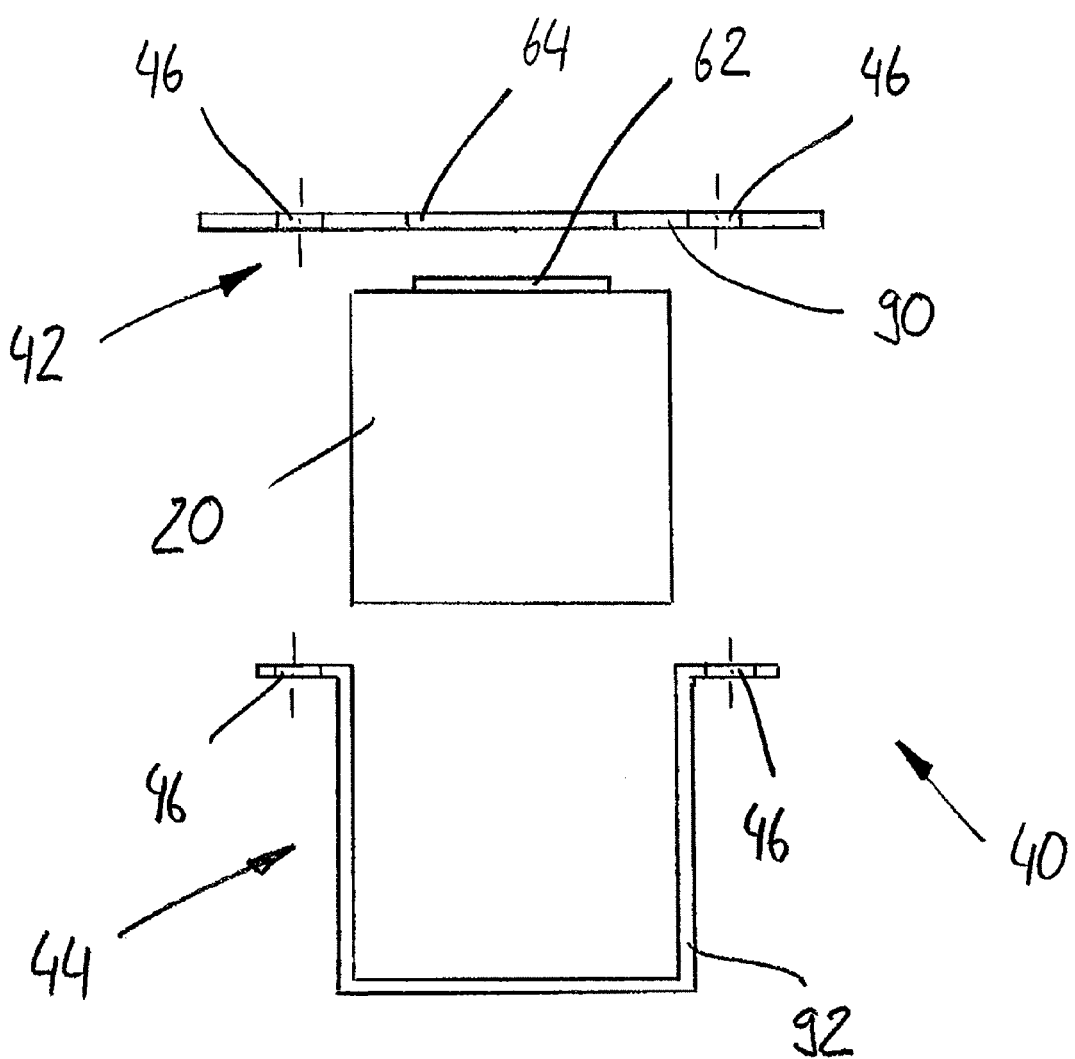
FIG. 3b a cross section of a further preferred embodiment of a supporting device for semi-trailers with a mounting unit.

FIG. 3b shows a further preferred embodiment of the supporting device 20 for semi-trailers with a mounting unit 40 in a cross section view. In comparison with FIG. 3a, the only difference is that the supporting device 20 has a protrusion 62 which engages in a rebate 64 of a mounting plate 90. Otherwise the statements referring to FIG. 3a apply.

Figure 4:
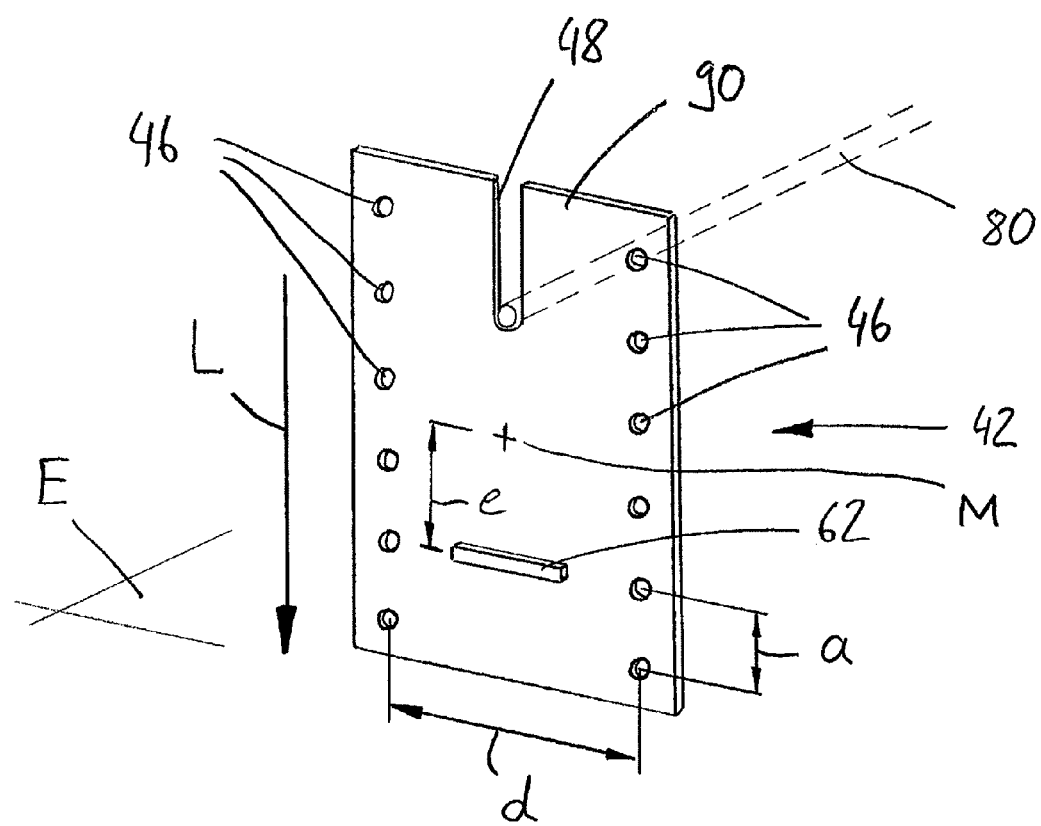
FIG. 4 a preferred embodiment of a mounting plate.

FIG. 4 shows a preferred embodiment of a mounting region 42 or a mounting plate 90 in perspective view. Two rows of fixing regions 46 are shown which each extend in a longitudinal direction L of the supporting device and the mounting plate 90. The longitudinal direction L stands perpendicular to a plane E. The two rows of fixing regions 46 have a row spacing d, viewed transversely to the longitudinal direction L. The fixing regions 46 are arranged with a hole spacing a in the longitudinal direction L. Furthermore a center point M of the mounting plate 90 is shown, of which a protrusion 62 is arranged offset by a distance e in the longitudinal direction L. An arrangement or positioning of a connecting shaft 80 relative to the mounting plate 90 is shown in dotted lines. As an example, the mounting plate 90 may for example have a recess 48 which is configured for passage of the connecting shaft 80 through the mounting plate 90.

Figure 5:
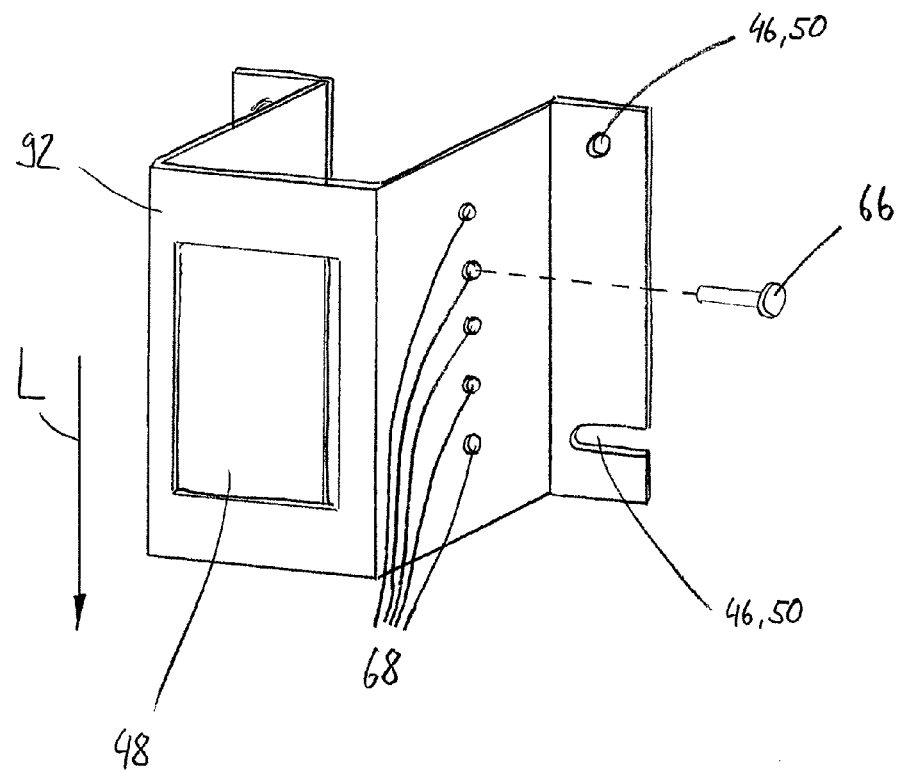
FIG. 5 a preferred embodiment of a bracket.

FIG. 5 shows a perspective view of a bracket 92 in a preferred embodiment. The bracket 92 comprises five openings 68 which are configured to create, together with the additional element 66, an additional form-fit connection with a supporting device 20 (not shown here). Furthermore, the bracket 92 comprises fixing regions 46 or bores 50 for arrangement for example on a further component 10. Evidently the bracket 92 may comprise at least one recess 48. For example, an external gear mechanism of a supporting device 20 could be arranged in the region of the recess 48.

Figure 6:
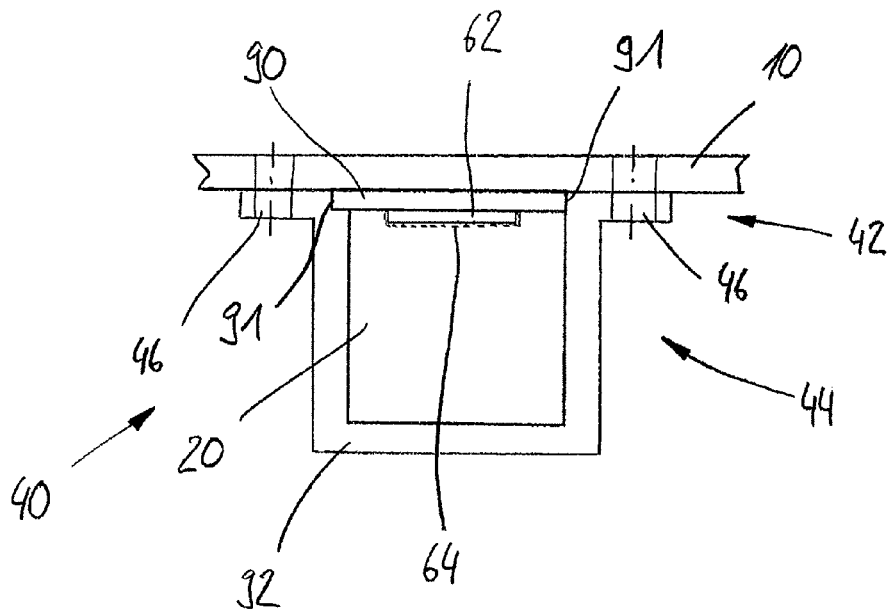
FIG. 6 a cross section of a further preferred embodiment of a supporting device for semi-trailers with a mounting unit.

FIG. 6 shows a cross section view of a further preferred embodiment of a supporting device 20 for semi-trailers with a mounting unit 40, viewed transversely to a longitudinal direction L of the supporting device 20. A mounting plate 90 has a protrusion 62 which engages in a rebate 64 of the supporting device 20. As a feature in this embodiment, the mounting plate 90 and a bracket 92 are connected by form fit in the mounting region 42 via an outer contour 91 of the mounting plate 90. The mounting plate 90 is inserted by form fit in the bracket 92. In its mounting region 42, the bracket 92 forms the corresponding fixing regions 46 for arrangement on the further element 10 or on a component to be supported.

Figure 7:
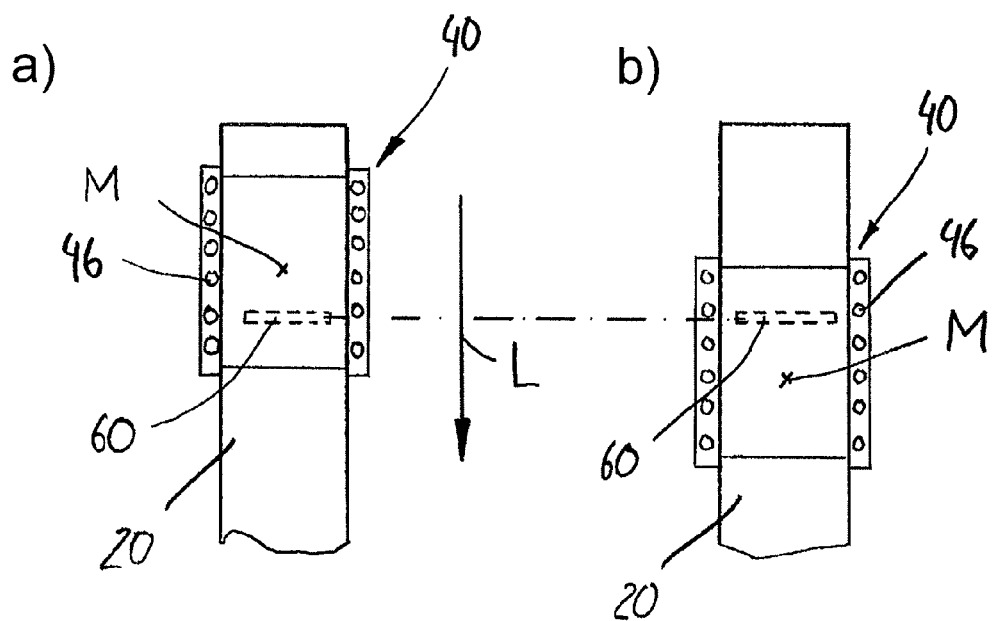
FIGS. 7a, b possible arrangements of a mounting unit on a supporting device in two different positions.

FIGS. 7a and 7b show arrangements of a mounting unit 40 on a supporting device 20 in two different positions. FIG. 7a shows the arrangement of the mounting unit in an upper position, while FIG. 7b shows the arrangement of the mounting unit in a lower position. An additional form-fit connection 60, which lies at the same height in FIGS. 7a and 7b, is depicted in dotted lines. In FIGS. 7a and 7b however the mounting unit is rotated through 180° so that a center point M of the mounting unit 40 lies once above the additional form-fit connection 60 and once below it. There is therefore a very great variability in the longitudinal direction L for the position of the fixing regions 46, although the total length of the mounting unit 40 is relatively short viewed in the longitudinal direction L.

LIST OF REFERENCE NUMERALS

10 Further element, semi-trailer
20 Supporting device
40 Mounting unit
42 Mounting region
44 Arrangement region
46 Fixing region
48 Recess
50 Bore
60 Additional form fit
62 Protrusion
64 Rebate
66 Additional element
68 Opening
80 Connecting shaft
90 Mounting plate
90' Protruding side part
91 Outer contour
92 Bracket
92' Cover
a Hole spacing
d Row spacing
e Distance
L Longitudinal direction
E Plane
M Center point of mounting plate

The invention claimed is:

1. A supporting assembly for semi-trailers, comprising:
a mounting unit configured to be arranged on a trailer component; and
a supporting device having an outer supporting tube and an inner supporting tube and extending in a longitudinal direction;
wherein the mounting unit is configured to fix the supporting device transversely to the longitudinal direction by a form-fit and a force-fit;
wherein the mounting unit has an arrangement region substantially surrounding an outer contour of the supporting device about the longitudinal axis thereof such that the supporting device can be fixed in a force-fitting and a form-fitting manner; and
wherein an additional form-fit connection is provided between the supporting device and the mounting unit, which prevents a displacement of the supporting device and the mounting unit relative to each other in the longitudinal direction.

2. The supporting assembly as claimed in claim 1, wherein the mounting unit comprises a mounting region and an arrangement region, wherein the mounting region is configured for the arrangement of the supporting device on the trailer component, and wherein the arrangement region is configured for the fixing of the trailer component.

3. The supporting assembly as claimed in claim 2, wherein at least one of a displacement of the supporting device transversely to the longitudinal direction and a twist of the trailer component about the longitudinal direction is prevented by at least one of the force fit and the form fit between the mounting unit and the trailer component.

4. The supporting assembly as claimed in claim 3, wherein the mounting region has at least one fixing region for arrangement of the mounting unit on the trailer component.

5. The supporting assembly as claimed in claim 4, wherein the mounting unit comprises multiple pieces.

6. The supporting assembly of claim 5, wherein the mounting unit consists of two pieces.

7. The supporting assembly as claimed in claim 5, wherein the additional form-fit connection includes at least one protrusion in at least one of the trailer component and the mounting unit which engages in a corresponding rebate.

8. The supporting assembly as claimed in claim 7, wherein the additional form-fit connection is arranged eccentrically on the mounting region viewed in the longitudinal direction.

9. The supporting assembly as claimed in claim 8, wherein the additional form-fit connection includes at least one additional element which is arranged in mutually corresponding openings of the trailer component and the mounting unit.

10. The supporting assembly as claimed in claim 9, wherein the arrangement region surrounds the trailer component at least in regions.

11. The supporting assembly as claimed in claim 10, wherein the force-fit connection is created by the cooperation of the mounting region with the arrangement region.

12. The supporting assembly as claimed in claim 11, wherein at least one of the form fit and the force-fit connection acts on an outer contour of the trailer component.

13. The supporting assembly as claimed in claim 12, wherein the force-fit connection prevents a displacement of the trailer component in the longitudinal direction.

14. The supporting assembly as claimed in claim 1, wherein at least one of a displacement of the supporting device transversely to the longitudinal direction and a twist of the trailer component about the longitudinal direction is prevented by at least one of the force-fit and the form-fit between the mounting unit and the trailer component.

15. The supporting assembly as claimed in claim 1, wherein the mounting region has at least one fixing region for arrangement of the mounting unit on the trailer component.

16. The supporting assembly as claimed in claim 1, wherein the mounting unit comprises multiple pieces.

17. The supporting assembly of claim 16, wherein the mounting unit consists of two pieces.

18. The supporting assembly as claimed in claim 1, wherein the additional form-fit connection includes at least one protrusion in at least one of the trailer component and the mounting unit which engages in a corresponding rebate.

19. The supporting assembly as claimed in claim 1, wherein the additional form-fit connection is arranged eccentrically on the mounting region viewed in the longitudinal direction.

20. The supporting assembly as claimed in claim 1, wherein the additional form-fit connection includes at least one additional element which is arranged in mutually corresponding openings of the trailer component and the mounting unit.

21. The supporting assembly as claimed in claim 2, wherein the arrangement region surrounds the trailer component at least in regions.

22. The supporting assembly as claimed in claim 2, wherein the force-fit connection is created by the cooperation of the mounting region with the arrangement region.

23. The supporting assembly as claimed in claim 1, wherein at least one of the form-fit and the force-fit connection acts on an outer contour of the trailer component.

24. The supporting assembly as claimed in claim 1, wherein the force-fit connection prevents a displacement of the trailer component in the longitudinal direction.

25. The supporting assembly as claimed in claim 1, wherein the trailer component includes a trailer frame member.

26. A supporting assembly for semi-trailers, comprising:
a mounting unit configured to be arranged on a trailer component; and
a supporting device having an outer supporting tube and an inner supporting tube and extending in a longitudinal direction;
wherein the mounting unit is configured to fix the supporting device transversely to the longitudinal direction by a form-fit and a force-fit;
wherein the mounting unit has an arrangement region comprising an outer contour of the supporting device about the longitudinal axis thereof such that the supporting device can be fixed in a force-fitting and a form-fitting manner; and
wherein an additional form-fit connection is provided between the supporting device and the mounting unit, which prevents a displacement of the supporting device and the mounting unit relative to each other in the longitudinal direction; and
wherein the additional form-fit connection includes at least one additional element which is arranged in mutually corresponding openings of the trailer component and the mounting unit.

* * * * *